March 25, 1969   D. D. KERSHAW   3,435,180
METHOD OF MAKING A MOLYBDENUM-TUNGSTEN THIMBLE SEAL
Filed Aug. 3, 1967   Sheet 1 of 2
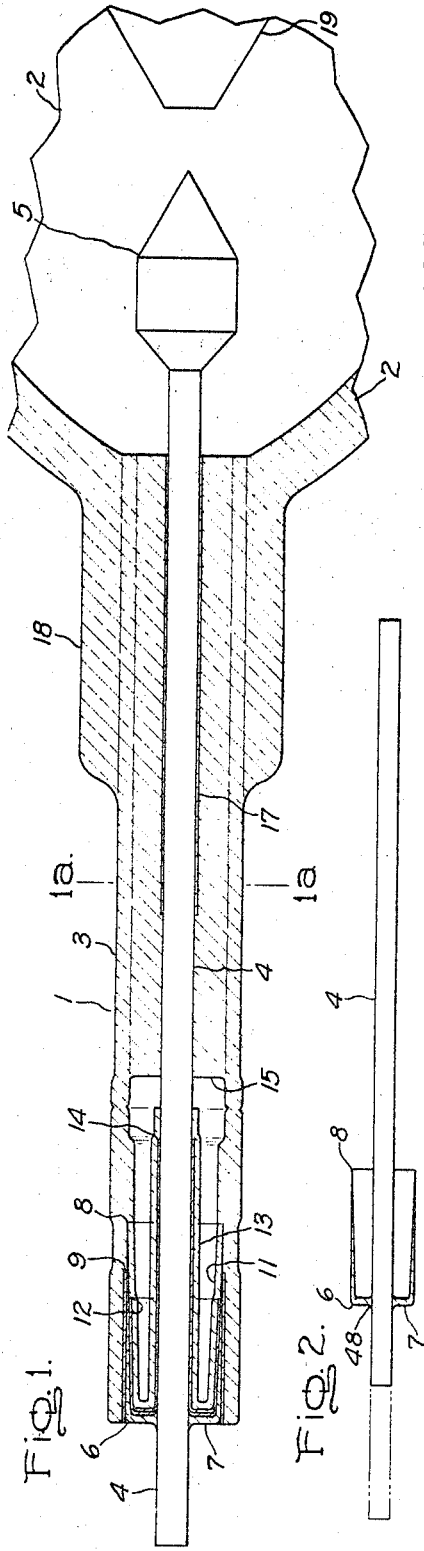
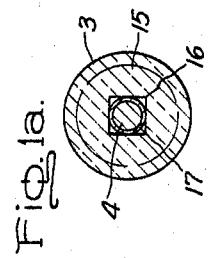
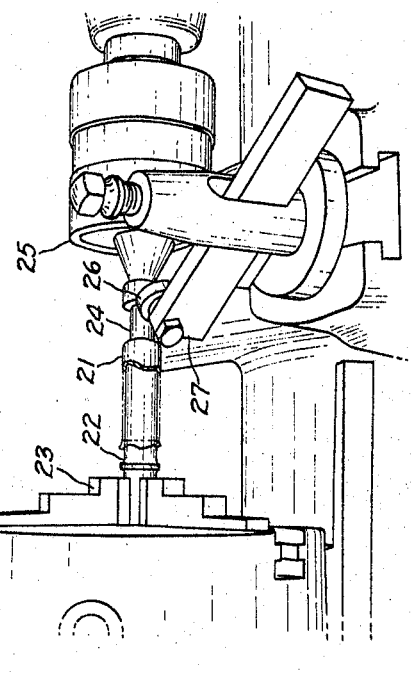
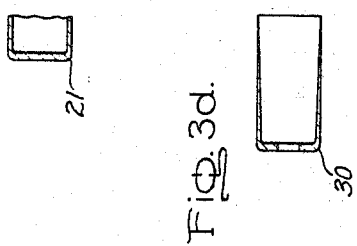
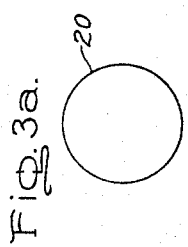
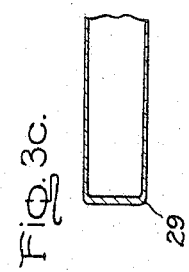
Inventor:
Delmar D. Kershaw
by Ernest W. Legner
His Attorney

3,435,180
METHOD OF MAKING A MOLYBDENUM-TUNGSTEN THIMBLE SEAL

Delmar D. Kershaw, Cleveland, Ohio, assignor to General Electric Company, a corporation of New York
Original application Sept. 29, 1964, Ser. No. 400,268. Divided and this application Aug. 3, 1967, Ser. No. 671,517
Int. Cl. B23k 1/02, 1/04
U.S. Cl. 219—85         3 Claims

ABSTRACT OF THE DISCLOSURE

A molybdenum thimble-tungsten rod assembly for a quartz stem thimble seal wherein the thimble is formed by drawing a shallow cup from a circular molybdenum disc which is then rolled out to the desired length and etched to a feather sealing edge. The molybdenum thimble is joined to the tungsten rod by a fused joint consisting solely of intermingled molybdenum and tungsten.

---

This application is a division of Ser. No. 400,268, filed Sept. 29, 1964, now abandoned.

This invention relates to a molybdenum thimble seal for use in electric discharge devices such as high pressure gas or vapor discharge lamps operating at high currents.

The molybdenum foil pinch seals used in mercury vapor lamps do not have the current capacity required for compact source lamps operating at currents ranging from 50 to several hundred amperes. With such lamps, two types of seals have so far achieved commercial status. The first type is the graded seal wherein the stresses due to the different rates of expansion of quartz and tungsten are reduced to a safe level by interposing a series of glasses with intermediate coefficients of expansion between the quartz envelope and the tungsten conductor. The second type is the multiple molybdenum foil seal in which an array of foils are connected in parallel and disposed between concentric quartz tubes sealed together. Both types require highly skilled labor in their manufacture and are expensive; also they are not sufficiently reliable. The multiple foil seals become excessively bulky in high current designs.

A third form of high current seal is described in Patent 2,504,522, Greiner, Quartz-to-Metal-Seal, which follows the Houskeeper principle of separating the sealing portion from the current conductor. The seal is in the form of a stem comprising a heavy current conductor or rod extending through a cup or thimble having a feathered sealing edge embedded in the wall of the stem tube. The Greiner seal was never manufactured commercially. Among the reasons for lack of commercial acceptance were the excessive cost of machining the molybdenum thimble, the weakness of the thimble so produced and the difficulty of uniting the molybdenum thimble to the tungsten rod in a permanently satisfactory fashion. The joint between the molybdenum thimble and the tungsten rod must be hermetic and remain so, despite high gas pressure and high operating temperatures, throughout the intended life of the seal.

The principal object of my invention is to provide a new and improved construction of a molybdenum thimble-tungsten rod assembly which is low in cost, easy to manufacture, and reliable in operation. Another object is to provide a convenient method of making such an assembly. A further object of my invention is to provide an improved refractory juncture between molybdenum thimble and tungsten rod seal members, along with a convenient method of making such a juncture.

In accordance with my invention, the molybdenum thimble is made by working a piece of flat molybdenum sheet into the required shape. Greater strength is thereby achieved, and the waste of metal which taken place with machining is avoided. In a preferred process, a shallow cup is drawn from a circular molybdenum disc; the shallow cup is placed on a tapered mandrel and rolled out to the desired length; the final reduction in cross-section of the skirt or side wall of the thimble at the open end is achieved by etching. In joining the molybdenum cup to the tungsten rod, I avoid the use of a third metal as a solder or braze material. Instead I use molybdenum itself which is melted and fused to form the juncture and fillet about the tungsten rod. A preferred method of making the juncture is to pass electric current through the rod to bring it up to the required temperature and to use a small ring of molybdenum filler wire to form the fillet on the inside and outside surfaces of the thimble-rod junction.

For further objects and advantages and for a better understanding of the invention, attention is now directed to the following description and accompanying drawing of species. Features of the invention believed to be novel will be more particularly pointed out in the appended claims.

In the drawings:

FIG. 1 is a fragmentary sectioned side view of a compact source xenon lamp having stems incorporating the thimble seal structures of the invention.

FIG. 1a is a cross-sectional view through the stem along line 1a–1a in FIG. 2.

FIG. 2 is a side view of the molybdenum cup and tungsten rod assembly embodying the invention.

Figure 5:
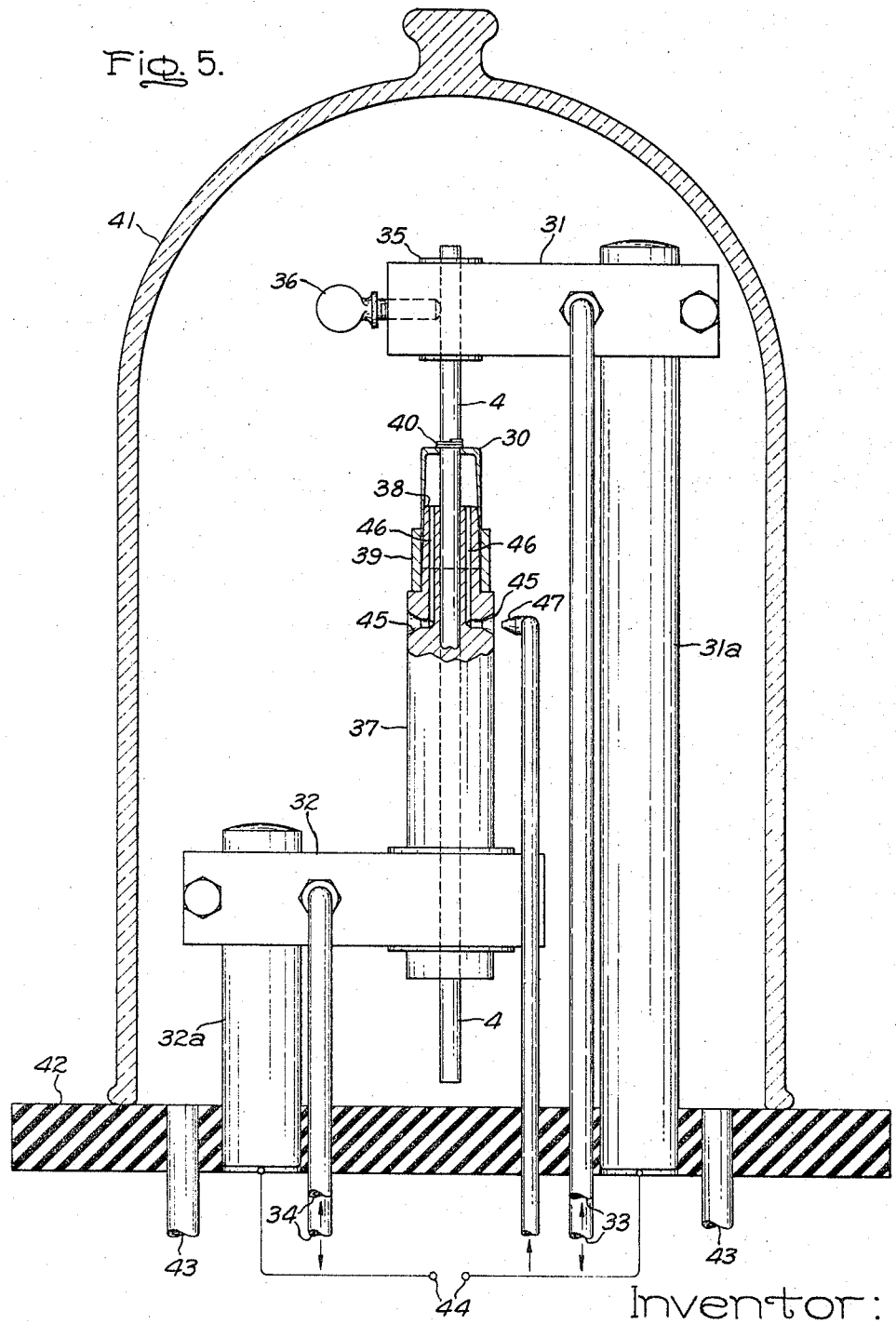

FIG. 3a, b, c and d show successive stages in cup manufacture by drawing and rolling.

FIG. 4 illustrates a typical lathe setup in rolling the shallow cup into a deep thimble.

FIG. 5 illustrates in partly schematic form the fusing apparatus used in joining the molybdenum cup to the tungsten rod.

Referring to FIG. 1 of the drawing, a stem or seal body 1 is shown joined to a clear quartz envelope 2 of a compact source high pressure gas lamp, a fragment only of the envelope being illustrated. The stem comprises an outer quartz tube 3 through which extends an inlead conductor in the form of a tungsten rod 4 supporting a first or cathode electrode 5 at its inner end within the envelope. Rod 4 extends through a deep cup or thimble 6 of molybdenum and is hermetically joined thereto where it passes through the domed end wall 7. The cylindrical side wall of the thimble tapers gradually in thickness from the shoulder next to the closed end to a feather edge 8 at the open end.

The open end of the thimble preferably faces in the direction of the inner end of the seal, that is in the direction of the lamp envelope to which the seal is joined. The quartz of the stem is fused to both inner and outer surfaces of the thimble about the feathered edge 8. In particular, the quartz of the outer stem tube 3 is sealed to the outside of the feathered edge 8 up to the thin molybdenum isolating foil 9. An intermediate quartz-like glass portion 11 is sealed to the inside surface of the feathered edge 8 up to the edge of an inner isolating foil 12. Intermediate glass portion 11 is continued into an inner glass portion 13 which reverts through the intermediate portion and embraces the tungsten rod 4 while being kept out of sealing contact thereby by isolating foil 14 wrapped around the rod.

Beyond the sealing portion proper of the stem in which the thimble is embedded, the outer stem tube 3 embraces and is fused to a capillary or thick-walled quartz tube portion 15 which assures a strong stem structure and provides mechanical support for the heavy electrode 5 mounted on the inner end of the rod. A square cross-section passageway 16, shown in FIG. 1a, extends through capillary tube 15 and assures a gas passage between the interior of the lamp envelope and the cavity within thimble 6. The square passageway at the inner end of the stem is collapsed, at least in part, onto tungsten rod 4 to eliminate play between the parts, but sticking between quartz and metal is prevented by a molybdenum isolating foil 17 wrapped around the rod. The molybdenum foil also assures a gas passage from the envelope to the interior of the seal. For further details on the seal structure, attention is directed to my copending application filed of even date herewith, entitled "Quartz-to-Metal-Seal," and assigned to the same assignee as the present invention.

The stem 1 is joined to the quartz envelope 2 by inserting its inner end into neck portion 18 of the envelope and collapsing the neck portion onto outer tube 3 of the stem. A second or anode electrode 19 (fragmentarily illustrated in FIG. 1) is supported within the envelope by means of a second stem (not shown) sealed into the opposite end of the envelope, diametrically opposite that illustrated.

In my aforementioned copending application, I have pointed out that among the considerations affecting the design of the thimble are the following: (1) the thimble should have sufficient thickness at the closed end to permit a reliable juncture to the tungsten rod passing through it; (2) the thimble walls should be strong enough to withstand the operating pressure of the lamp; (3) the thimble wall thickness should be as small as possible in order to achieve maximum seal reliability. I have found that a long or deep thimble is much preferable to a short, squat cup or thimble in meeting the foregoing requirements. In general, a thimble having a ratio of length to diameter not less than 1.75 to 1 is desirable and 2 to 1 is preferable. Suitable proportions for a thimble 6 are illustrated in FIG. 2 of the drawings: the length is 1" and the diameter is .470" such corresponding to a ratio of length to diameter of 2.1 to 1.

In accordance with the present invention, a molybdenum thimble having the required proportions is preferably formed from flat molybdenum sheet by drawing, rolling and etching. Referring to FIG. 3a, the starting material is a disc 20 of molybdenum sheet which, for the illustrated example, may be .875" in diameter and .020" thick. A shallow cup, suitably .500" O.D. by .312" deep, as illustrated at 21 in FIG. 3b, is drawn from the circular disc. The disc is placed in the female part of the die and the cup is formed to the male part of the die. The diameter and radius of curvature of the male part of the die are the same as the end of the rolling mandrel to be described shortly, in order that the drawn cup fit snugly on the rolling mandrel. In the absence of a close fit on the rolling mandrel, the cup will crack during the initial stage of rolling.

The extension of the drawn cup to a long, thin tapered cylinder, by way of example from 5/16" long to 1 3/8" long, is accomplished by a series of rolling operations. A suitable setup using a conventional lathe is illustrated in FIG. 4. A hardened tapered mandrel 22 is mounted in the lathe chuck 23 and the shallow cup 21 is mounted on the end of the mandrel and retained in place by a pressing stud 24 which is driven against the bottom of the cup by tail stock 25. The cup and mandrel are then heated by an illuminating gas burner (not shown) to an initial temperature of about 300° C. to improve ductility; the working of the metal is nevertheless considered to be cold working. The rolling tool consists of an 11/16" diameter radial ball bearing 26 mounted on an arm 27. The rolling tool is set at an angle of about 30° normal to the work with the center of the ball bearing located slightly above the center of the mandrel. The roller tool is made to travel across, that is, traverse, the cup using an automatic feed. Several passes, suitably six, are made and the cross-feed is increased at each successive pass. The fabrication of thimbles by this method produces a uniform elongated cylindrical wall portion that is free from flaws, as illustrated at 29 in FIG. 3c. The extensive cold working increases the recrystalization temperature of the metal and provides a preferential axis for grain growth along the axis of the thimble; this results in greater strength and ductility which persists even after high temperature cycling.

After rolling, the thimble is cut to the required length (25 millimeters) using a cutoff wheel, and a hole is punched through the center of the closed or domed end to accommodate the tungsten rod.

The rolling operation produces a tapered thimble having a thickness falling off from .005" at the closed end to .003" at the open end. A further reduction in thickness is required at the open end for optimum sealing conditions. This may be achieved by electrolytic etching in sodium hydroxide solution in which the cup is submerged to an appropriate depth, suitably 10 millimeters, and surrounded by a circular tungsten electrode. The etching is continued until the wall thickness is reduced to approximately .002" at a distance of 10 millimeters from the open edge. The punched and etched thimble is shown at 30 in FIG. 3d.

Heretofore, in joining the molybdenum thimble to the tungsten rod, the practice has been to use a brazing metal having a lower melting point than either molybdenum or tungsten, for instance platinum. Such joints are not sufficiently resistant to high temperature cycling and in time fail and develop leaks. According to another aspect of my invention, I attach the molybdenum cup to the tungsten rod by what may be described as a fusion process wherein the filler metal is also molybdenum. The joint and fillet about it consist exclusively of molybdenum merging into tungsten. Since the molybdenum thimble and molybdenum filler have the same melting point, it is necessary to control accurately the temperature distribution to avoid melting the thimble away and ruining it.

Suitable equipment for effecting the fusion is illustrated in FIG. 5. It comprises a pair of massive water-cooled brass electrode blocks 31, 32 mounted on standards 31a, 32a which are electrical conductors; cooling water is supplied to the blocks through conduits 33, 34. Tungsten rod 4 is supported vertically between the blocks which serve both as electrical connectors and heat sinks. The electrical connection in the top block 31 is made through a molybdenum insert 35 provided with a set screw 36 by which the tungsten rod 4 is locked in place. Thimble 30 encircles the rod and is supported by a molybdenum pedestal 37 on lower block 32 whereof the upper end is machined down to a stud 38 which fits inside the thimble. A retaining ring 39 around the outside of the thimble seats on the shoulder of stud 38 and maintains the thimble in alignment. Molybdenum pedestal 37 is free to move in the lower block to allow for expansion of the tungsten rod. A ring or a few turns 40 of molybdenum filler wire encircles the rod 4 and rests against the closed end of the thimble 30.

The fusion equipment is enclosed in a bell jar 41 which seats on a plate 42. Tubes 43 passing through the plate are used to flush the bell jar with dry nitrogen and then to fill it with hydrogen. For the illustrated rod having a diameter of .150", the current required to reach 2650° C. which is the fusion temperature of molybdenum, is approximately 800 amperes. The terminals of the electrical current conductors to the bass blocks 31, 32 are schematically indicated at 44. Pedestal 37 is provided with two small holes 45 in its side which communicate by means of passageways 46 with the interior of the thimble when seated on stud 38. A jet of nitrogen or hydrogen is directed by a nozzle 47 against one of the holes 45 in order to purge any air inside the thimble during the initial purging of the bell jar.

After the bell jar has been purged with nitrogen and then filled with hydrogen, a current of approximately 600 amperes is supplied at terminals 44 in order to raise the tungsten rod temperature to about 1400 to 1500° C. This setting is maintained long enough to allow the parts to reach substantial temperature equilibrium. The current is then increased until the molybdenum filler wire 40 melts on the rod. The filler wire flows down due to the temperature distribution and contacts the domed end of the thimble. A slight increase in current at this moment causes the closed end of the thimble to melt next to the tungsten rod and the molten filler wire flows and joins the thimble, the molten metal being held in place by surface tension to the tungsten rod. The current is then turned off and the assembly allowed to cool before admitting air. The molybdenum filler wire fuses and forms a fillet 48 (FIG. 2) on the inside and outside surfaces of the thimble-rod junction. The molybdenum metal actually forms an alloy with the tungsten and it is a characteristic of this alloy that as more tungsten dissolves into it, its melting point is raised and it automatically fuses and solidifies. The joint and fillet comprise only molybdenum intermingled with tungsten.

In an alternative system of making the molybdenum thimble-tungsten rod juncture, I have used electron beam welding in a vacuum, again using molybdenum as the filler. Although I have succeeded in making joints by this method, I have found it more difficult to control the flow of the molybdenum and I prefer to use the electric heating method described above.

Tests of molybdenum thimble-tungsten rod assemblies fabricated in the manner which has been described have clearly established their superiority over prior constructions. The drawing and rolling of the thimble from sheet results in a grain structure and orientation which achieves much greater strength than machining from rod stock. The increment in strength thus realized is extremely important and may spell the difference between success and failure in achieving a hermetic seal because the design requirements demand at the same time minimum thickness in order to bond hermetically to quartz and sufficient strength to withstand the gas pressure within the lamp envelope.

The joint and fillet consisting solely of molybdenum intermingled with tungsten constitutes a solid solution without discrete phases; such a joint is highly resistant to high temperature, high pressure cycling. The juncture does not fracture nor develops leaks even after operation much in excess of the design life of the compact source xenon lamps for which the seal is intended. The joint is greately superior to the platinum brazes between the molybdenum thimble and the tungsten rod formerly used and which developed leaks in a high proportion of cases.

The specific embodiment of the invention which has been illustrated and described in detail is intended merely as an example and the scope of the invention is to be determined by the appended claims.

What I claim as new and desire to secure by Letters Patent of the United States is:

1. The method of hermetically joining a molybdenum thimble to a tungsten rod extending through the thimble and passing through an aperture in the closed end thereof which comprises:

supporting the rod vertically between a pair of electrodes with the thimble encircling the rod and a piece of molybdenum filler immediately above the closed end of the thimble;

providing an atmosphere of hydrogen about the rod and thimble;

passing an electric current through the rod to melt the molybdenum filler into the end of the thimble in order to merge therewith and form a fillet about the tungsten rod;

and thereafter cooling the assembly prior to removal from the hydrogen atmosphere.

2. The method of hermetically joining a molybdenum thimble having one end open and the other end closed but with an aperture therethrough to a tungsten rod extending through the thimble and passing through the aperture which comprises:

supporting the rod vertically between a pair of massive electrode blocks with the thimble encircling the rod between the blocks and with a ring of molybdenum filler wire encircling the rod immediately above the closed end of the thimble;

providing an atmosphere of hydrogen about the rod and thimble;

passing an electric current through the rod to melt the molybdenum filler into the end of the thimble in order to merge therewith and form a fillet about the tungsten rod;

and thereafter cooling the assembly prior to removal from the hydrogen atmosphere.

3. The method of hermetically joining a molybdenum thimble having one end and the other end closed but with an aperture therethrough to a tungsten rod passing through the aperture which comprises:

supporting the rod vertically between a pair of massive electrode blocks with the thimble encircling the rod between the blocks and with a ring of molybdenum filler wire encircling the rod immediately above the closed end of the thimble;

providing an atmosphere of hydrogen about the rod and thimble;

passing an electric current through the rod to melt the molybdenum filler into the end of the thimble;

increasing the current just sufficiently to melt the closed end of the thimble adjacent the rod in order to merge the molten molybdenum from the filler therewith and form a fillet joining the closed end of the thimble to the rod;

and thereafter cooling the assembly prior to removal from the hydrogen atmosphere.

References Cited

UNITED STATES PATENTS 2,504,522   4/1950   Greiner _____ 174—50.63

OTHER REFERENCES

"Tungsten," by Colin J. Smithells, D. Van Nostrand Co., 1927, pp. 53 and 54.

RICHARD M. WOOD, *Primary Examiner.*

B. A. STEIN, *Assistant Examiner.*

U.S. Cl. X. R.

219—118; 174—50.61